United States Patent [19]
Matsuura

[11] Patent Number: 5,477,119
[45] Date of Patent: Dec. 19, 1995

[54] TRACING CONTROL SYSTEM

[75] Inventor: Hitoshi Matsuura, Hachioji, Japan

[73] Assignee: Fanuc Ltd., Minamitsuru, Japan

[21] Appl. No.: 365,868

[22] Filed: Dec. 29, 1994

[30] Foreign Application Priority Data

Jan. 14, 1994 [JP] Japan ................................. 6-002294

[51] Int. Cl.⁶ .................................................. B23Q 35/12
[52] U.S. Cl. ........................... 318/576; 318/571; 318/600
[58] Field of Search ..................................... 318/569, 570, 318/571, 576, 578, 600, 601; 364/474.03

[56] References Cited

U.S. PATENT DOCUMENTS

| | | | |
|---|---|---|---|
| 4,296,473 | 10/1981 | Imazeki et al. | 318/578 X |
| 4,646,225 | 2/1987 | Matsuura | 318/578 X |
| 4,709,482 | 12/1987 | Matsuura et al. | 33/1 M |
| 4,814,998 | 3/1989 | Aramaki | 318/621 X |
| 5,341,079 | 8/1994 | Matsuura et al. | 318/632 |

*Primary Examiner*—Bentsu Ro
*Attorney, Agent, or Firm*—Staas & Halsey

[57] ABSTRACT

A tracing control system for tracing a groove counter can easily measure the groove contour formed on a three-dimensional model surface. A tracer head is provided with a stylus having a size enabling the stylus to slide in a groove formed on the model surface in the state that the stylus receives a load from three axial directions. Amount of displacement sensing means senses the amount of displacement of the stylus. Displacement vector calculation means calculates the displacement vector of the stylus based on the sensed amount of displacement of the stylus. Movement control means controls the positional movement of the tracer head so that the displacement vector is equal to a predetermined vector value at all times. Position sensing means senses the present position of the tracer head. Data creation means creates digitized data based on the sensed present position of the tracer head and the amount of displacement of the stylus.

3 Claims, 6 Drawing Sheets

TRACING CONTROL SYSTEM

BACKGROUND OF THE INVENTION

1. Field of the Invention

The present invention relates to a tracing control system for creating digitized data by tracing the contour of a model surface, and more specifically to a tracing control system for tracing a groove contour.

2. Description of the Related Art

When the groove contour formed on a model surface is measured, a stylus must be moved while keeping its height from the bottom of a groove constant to correctly create the digitized data of the groove contour. For this purpose, when a groove contour formed on a model surface having a two-dimensional plane is measured, a stylus is conventionally moved along the groove contour by fixing the movement of an axis in the direction perpendicular to the plane of the model.

However, in the case of a groove contour formed on the three-dimensionally irregular surface of a model, there is not any technology which can move a stylus at a height constant from the bottom of a groove. Thus, when a three-dimensional groove is traced, no system has not been conventionally employed except a system for tracing the surface of the groove by moving a stylus in a direction which is across the groove. Therefore, tracing operation must be carried out many times in accordance with the width of a groove, thus a tracing efficiency is not good.

SUMMARY OF THE INVENTION

An object of the present invention is to provide a tracing control system capable of easily measuring a groove contour formed on the three-dimensionally irregular surface of a model.

To achieve the above object, there is provided a tracing control system for creating digitized data by tracing the contour of a model surface, which comprises a tracer head provided with a stylus having a size enabling the stylus to slide in a groove formed on the model surface in the state that the stylus receives a load from three axial directions, amount of displacement sensing means for sensing the amount of displacement of the stylus, displacement vector calculation means for calculating the displacement vector of the stylus based on the sensed amount of displacement of the stylus, movement control means for controlling the positional movement of the tracer head so that the displacement vector is equal to a predetermined vector value at all times, position sensing means for sensing the present position of the tracer head and data creation means for creating digitized data based on the sensed present position of the tracer head and the amount of displacement of the stylus.

The tracer head is provided with the stylus having the size enabling the stylus to slide in a groove formed on the surface of the model in the state that the stylus receives a load from the three axial directions. The amount of displacement sensing means senses the amount of displacement of the stylus. The displacement vector calculation means calculates the displacement vector of the stylus based on the sensed amount of displacement of the stylus. The movement control means controls the positional movement of the tracer head so that the displacement vector is equal to the predetermined vector value at all times. The position sensing means senses the present position of the tracer head. The data creation means creates digitized data based on the sensed present position of the tracer head and the amount of displacement of the stylus.

Therefore, digitized data can be easily created with respect to a groove contour formed on the three-dimensionally irregular surface of a model by employing the same tracing feed as that employed in the groove formed on an usual two-dimensional plane.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment of the present invention will be described below with reference to the drawings.

Figure 1:
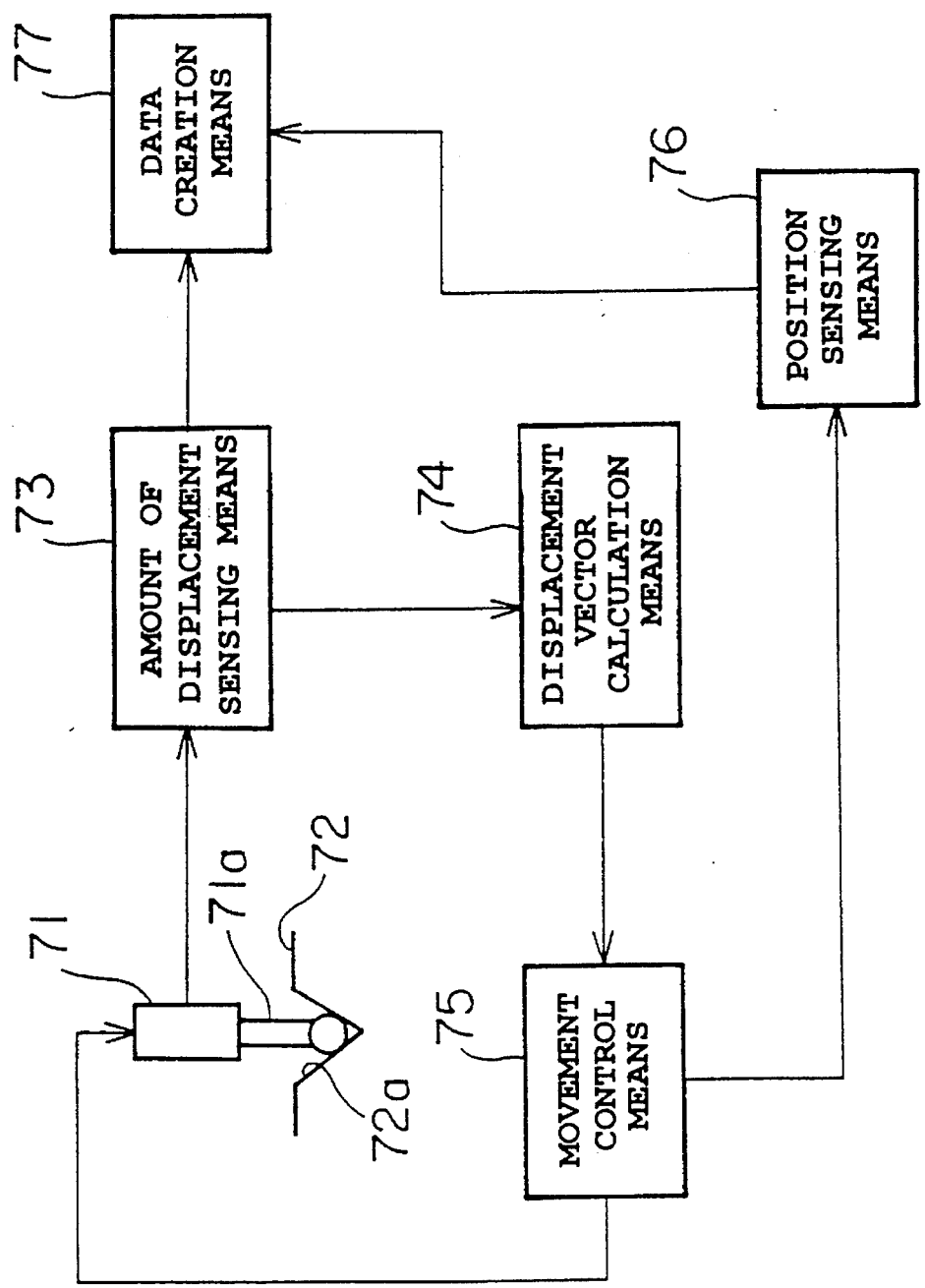
FIG. 1 is a block diagram showing the concept of the function of the present invention.

FIG. 1 is a block diagram showing the concept of the function of the present invention. A tracer head 71 includes a stylus 71a having a size which enables the stylus 71a to slide in a groove 72a formed on a model surface 72 in the state that the stylus 71a receives a load from three axial directions. Amount of displacement sensing means 73 senses the amount of displacement of the stylus 71a. Displacement vector calculation means 74 calculates the displacement vector of the stylus 71a based on the sensed amount of displacement of the stylus 71a. Movement control means 75 controls the positional movement of the tracer head 71 so that the displacement vector has a predetermined vector value at all times. Position sensing means 76 senses the present position of the tracer head 71. Data creation means 77 creates digitized data based on the sensed present position of the tracer head 71 and the amount of displacement of the stylus 71a.

Figure 2:
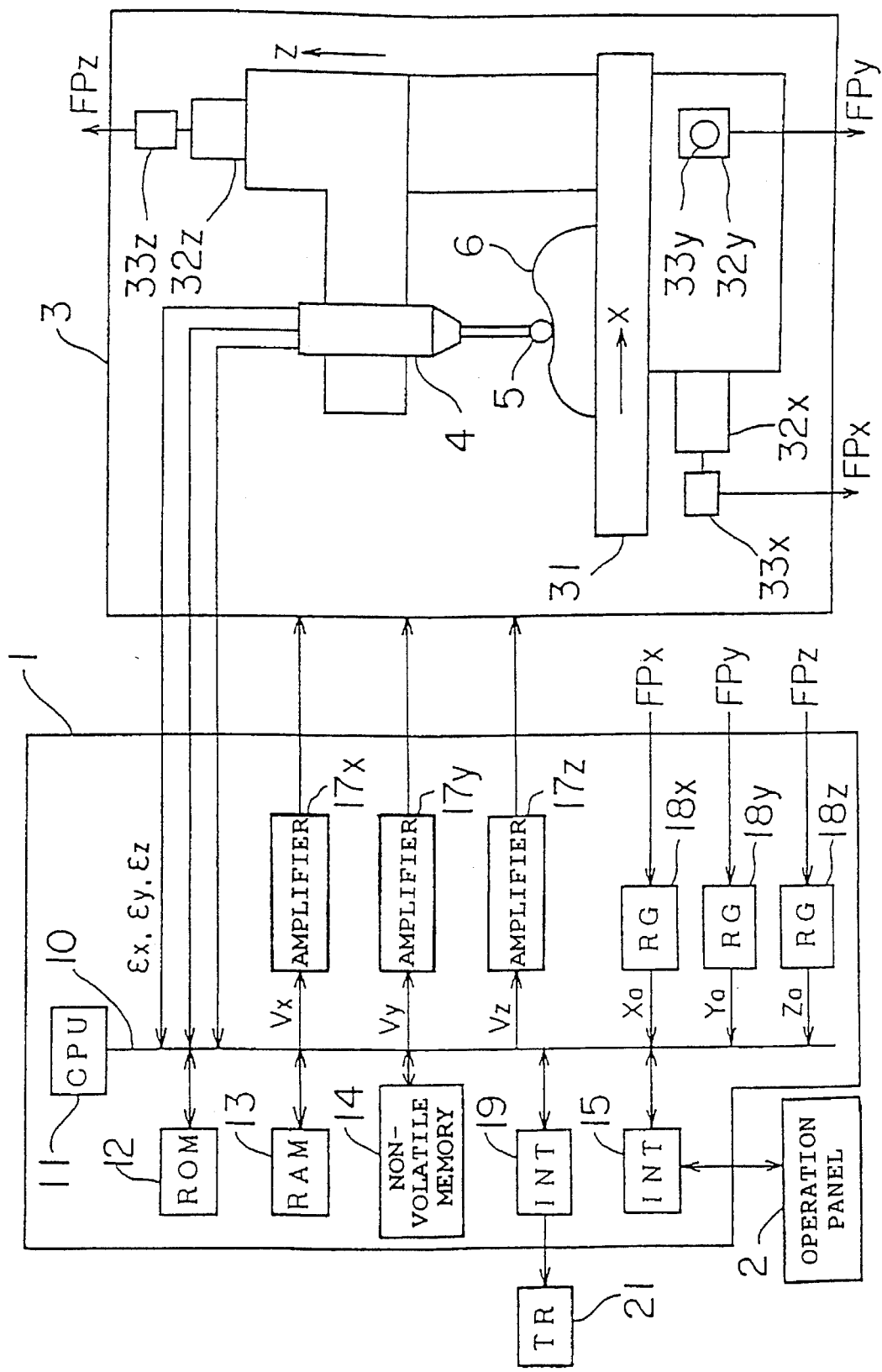
FIG. 2 is a block diagram showing a tracing digitizing control apparatus of an embodiment of the present invention.

FIG. 2 is a block diagram showing a tracing digitizing control apparatus of the embodiment of the present invention. In FIG. 2, a processor 11 reads a system program stored in a ROM 12 through a bus 10 and controls the overall operation of the tracing digitizing control apparatus 1 according to the system program.

A RAM 13 stores the amounts of displacement of respective axes sensed by the tracer head 71 and temporary data. A non-volatile memory 14 is backed up by a battery not shown and stores various parameters such as tracing directions, tracing speeds and the like input from an operation panel 2 through an interface 15.

A tracer head 4 provided for a tracing machine 3 senses the respective amounts of displacement εx, εy and εz of X-, Y- and Z-axes which are produced when a stylus 5 attached to the extreme end of the tracer head 4 comes into contact with a model 6 and inputs them to the processor 11.

The processor 11 produces the speed commands Vx, Vy and Vz of the respective axes by well-known technology based on the amounts of displacement of these axes and a commanded tracing direction and tracing speed. These speed commands are input to servoamplifiers 17x, 17y and 17z and the servomotors 32x, 32y and 32z of the tracing machine 3 are driven in response to the outputs from the servoamplifiers.

With this arrangement, the tracer head 4 is moved so that the relative positional relationship between the tracer head 4 and the model 6 is kept constant as well as tracing operation is carried out by moving a table 31 on which the model 6 is loaded in an X-axis direction and a Y-axis direction which is perpendicular to the paper.

Pulse coders 33x, 33y and 33z produce pulse signals FPx, FPy and FPz each time the servomotors 32x, 32y and 32z rotate by a predetermined angle. The present position registers 18x, 18y and 18z in the tracing digitizing control apparatus 1 reversibly count the pulse signals, respectively to thereby determine the present position data Xa, Ya and Za of the respective axes and input the data to the processor 11.

In digitizing operation, the processor 11 fetches the position data at each predetermined time or when an amount of variation of the position data exceeds a predetermined tolerance value, and creates digitized data.

The digitized data is input to a paper tape reader/puncher 21 or external storage device through an interface 19 and an NC format command is made. Further, tracing can be also carried out with pinpoint accuracy in an on-line fashion by directly connecting a numerically controlled machine tool not shown to the interface 19.

Next, a tracing control system effected by the tracing digitizing control apparatus 1 will be described by way of specific example.

Figure 3:
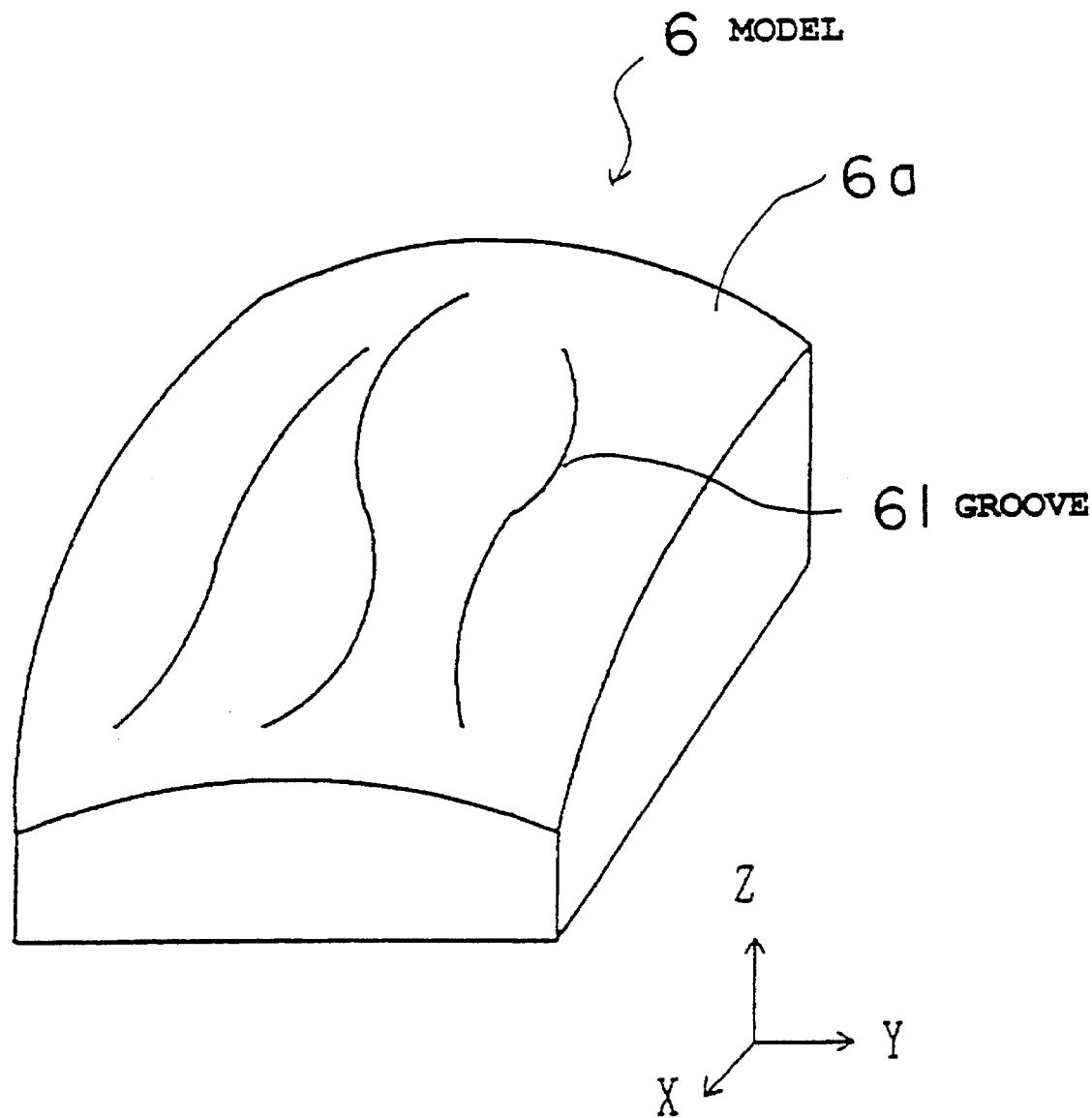
FIG. 3 is an outside view of a model to be traced.

FIG. 3 is an outside view of the model 6 to be traced. The model surface 6a of the model 6 is swelled in the Z-axis direction and has grooves 61 formed along the contour of the model surface 6a. The stylus 5 moves along one of the grooves 61.

Figure 4:
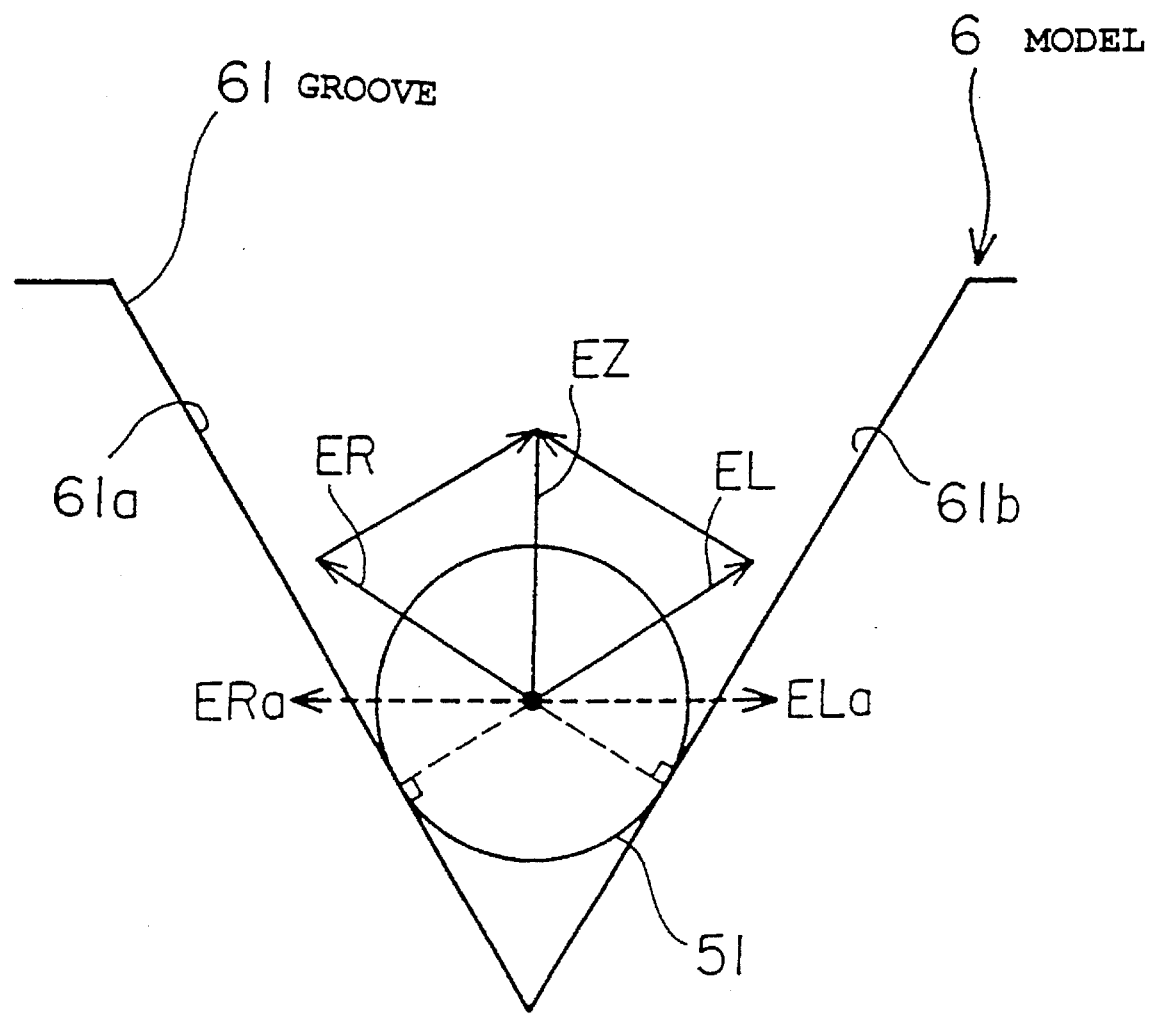
FIG. 4 is a cross sectional view showing the groove of FIG. 3 by cutting it perpendicularly to a direction toward which a tracer head proceeds to explain a tracing control system of the embodiment by way of specific example.

FIG. 4 is a cross sectional view showing the groove 61 of FIG. 3 by cutting it perpendicularly to a direction toward which the tracer head 4 proceeds to explain a tracing control system of the embodiment by way of specific example. The extreme end 51 of the stylus 5 is formed on, for example, a spherical shape having a size enabling the extreme end 51 to be sufficiently engaged with the groove 61. Further, it is assumed that the groove 61 is formed in a triangular shape. When this groove 61 is traced, first, the processor 11 causes the extreme end 51 of the stylus 5 to approach into the groove 61 and come into contact with the inner walls 61a and 61b on the both sides of the groove 61.

At that time, the extreme end 51 of the stylus 5 receives forces in the normal directions from the inner walls 61a and 61b, respectively and tends to be displaced by amounts of displacement ER and EL. The processor 11 controls the horizontal movement of the tracer head 4 so that the horizontal component ERa of the amount of displacement ER is balanced with the horizontal component ELa of the amount of displacement EL. When the horizontal component ERa is balanced with the horizontal component ELa, the composite amount obtained from the amounts of displacement ER and EL is equal to an amount of displacement EZ which is parallel with the Z-axis.

Further, the processor 11 controls the vertical movement of the tracer head 4 so that the amount of displacement EZ is equal to a predetermined value $EZ_0$. When ERa=ELa and $EZ=EZ_0$ are achieved in the above way, the tracer head 4 is moved to maintain this state thereafter. With this operation, tracing operation can be carried out in the state that the extreme end 51 of the stylus 5 is always in contact with the inner walls 61a and 61b of the groove 61. Therefore, even if the model surface 6a is three-dimensionally curved, digitized data can be correctly created.

Figure 5:
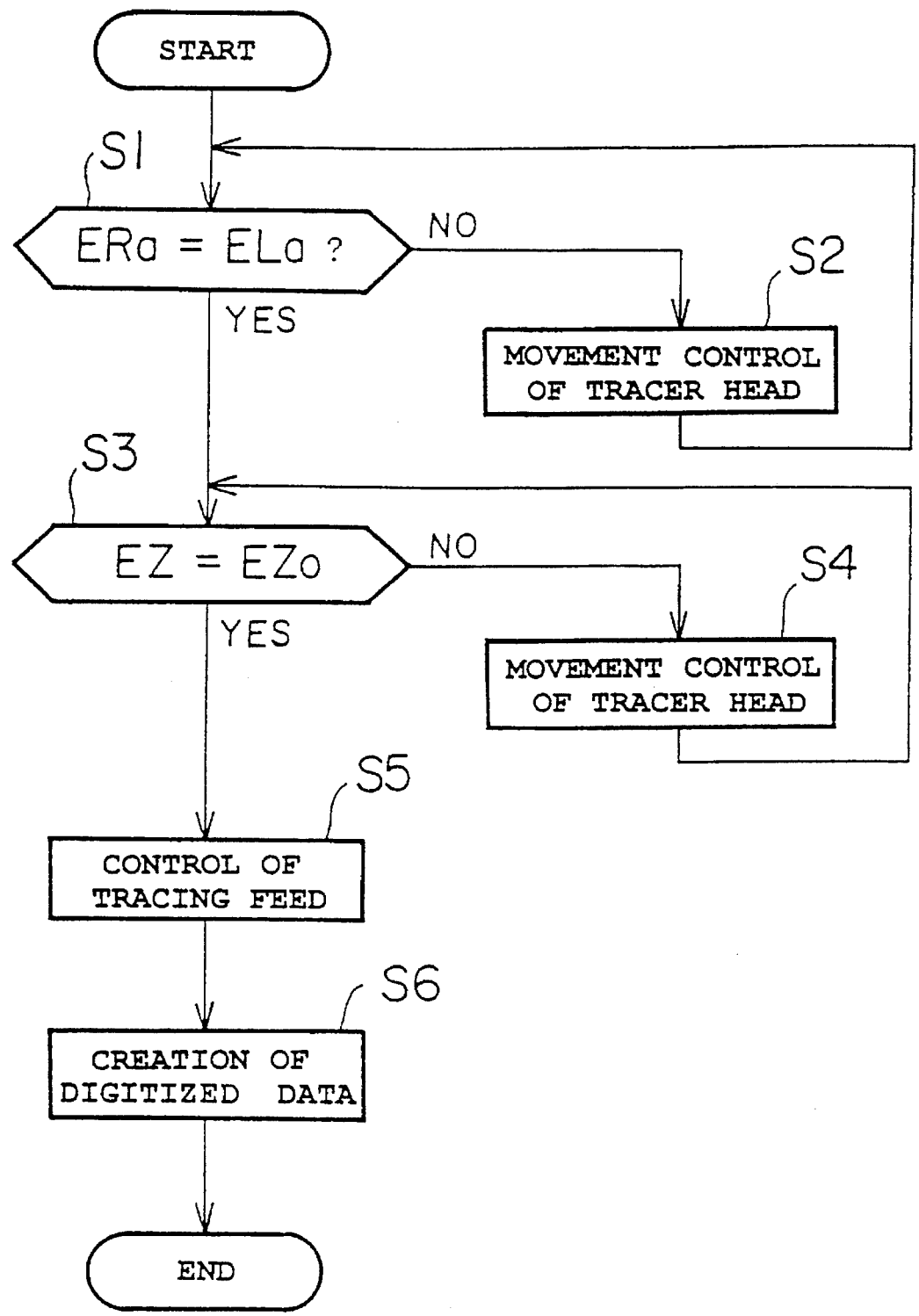
FIG. 5 is a flowchart showing a processing sequence of a processor for controlling tracing operation.

FIG. 5 is a flowchart showing a processing sequence of the processor 11 for controlling the tracing operation.

[S1] It is determined whether ERa=ELa is achieved or not, and when ERa=ELa is achieved, the process goes to step S3, and if not, the step goes to step S2.

[S2] The movement of the axis of the tracer head 4 is controlled so that ERa=ELa is achieved

[S3] It is determined whether $EZ=EZ_0$ is achieved or not, and when $EZ=EZ_0$ is achieved, the process goes to step S5, and if not, the step goes to step S4.

[S4] The movement of the axis of the tracer head 4 is controlled so that $EZ=EZ_0$ is achieved.

[S5] Tracing feed is carried out while maintaining ERa= ELa and $EZ=EZ_0$.

[S6] Digitized data of the groove contour is created.

Note, a tracing feed speed may be a constant speed with respect to a feed direction or overridden in accordance with the magnitude of $EZ-EZ_0$ which is the difference between the amount of displacement EZ of the stylus 5 in the Z-axis direction and the predetermined value $EZ_0$.

Figure 6:
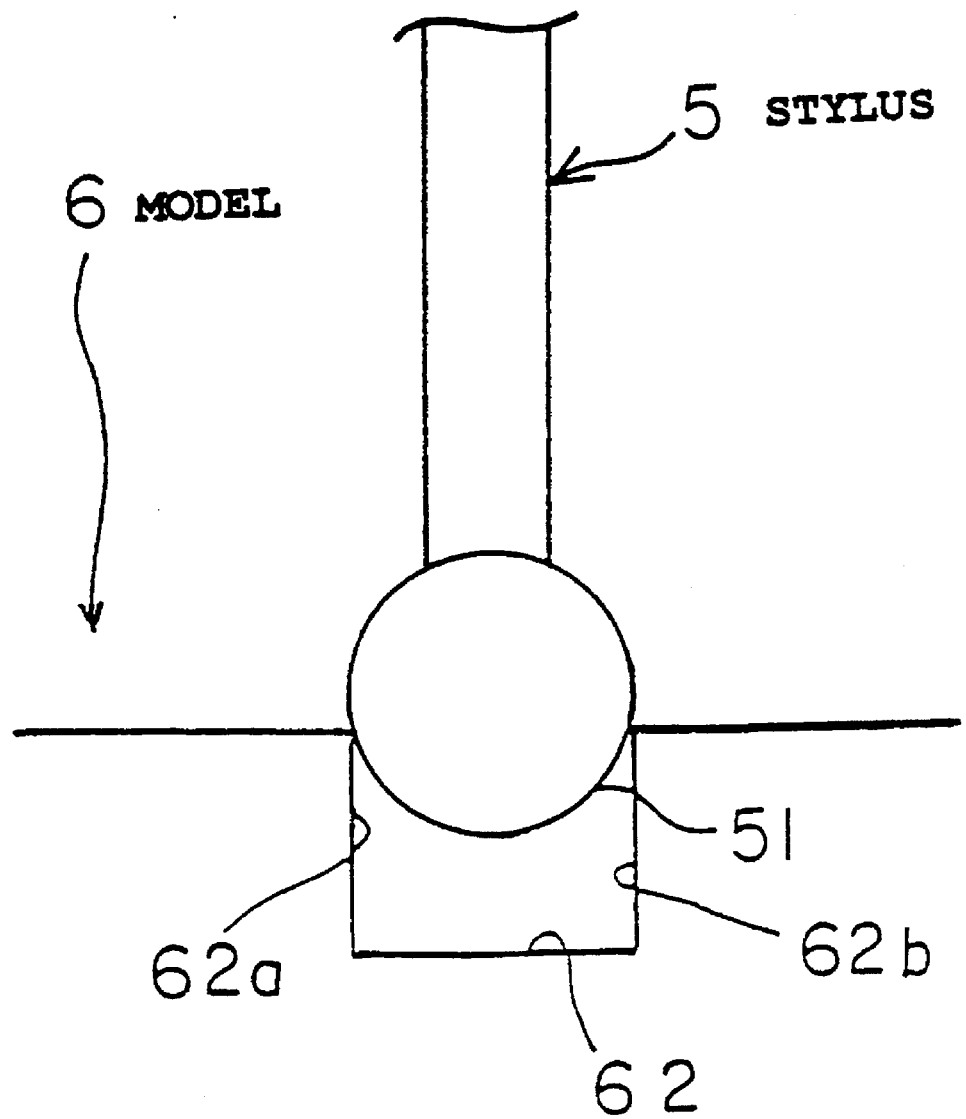
FIG. 6 is a view showing another embodiment of the present invention.

Further, although the groove 61 is formed on the triangular shape in this embodiment, it may be a square groove 62 as shown in FIG. 6. In this case, however, the extreme end 51 of the stylus 5 must have a diameter which is slightly larger than the distance between the inner walls 62a and 62b of a groove 62. With this arrangement, even if the model surface 6a is three-dimensionally curved similarly to the aforesaid embodiment, digitized data can be correctly created.

As described above, according to the present invention, since the displacement vector of the stylus is calculated based on the amount of displacement of the stylus having the size enabling the stylus to slide in the groove formed in a model surface in the state that the stylus receives a load from three axial directions and the positional movement of the tracer head is controlled so that the displacement vector is equal to a predetermined vector value at all times, digitized data can be easily created with respect to a groove contour formed on the three-dimensionally irregular surface of a model by employing the same tracing feed as that employed in the groove formed on an usual two-dimensional plane.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A tracing control system for creating digitized data by tracing the contour of a model surface, comprising:

a tracer head provided with a stylus having a size enabling said stylus to slide in a groove formed on the model surface in the state that the stylus receives a load from three axial directions;

amount of displacement sensing means for sensing the amount of displacement of said stylus;

displacement vector calculation means for calculating the displacement vector of said stylus based on the sensed amount of displacement of said stylus;

movement control means for controlling the positional movement of said tracer head so that the displacement vector is equal to a predetermined vector value at all times;

position sensing means for sensing the present position of said tracer head; and data creation means for creating digitized data based on the sensed present position of said tracer head and the amount of displacement of said stylus.

2. A tracing control system according to claim 1, wherein the predetermined vector value is set in a Z-axis direction.

3. A tracing control system according to claim 1, including override control means for overriding a tracing feed speed in accordance with the value of difference between the amount of displacement of said stylus and the predetermined vector value.

* * * * *